Sept. 22, 1931.  A. WENDT  1,824,314
SAFETY PACKING STICK
Filed Feb. 19, 1930

Patented Sept. 22, 1931

1,824,314

UNITED STATES PATENT OFFICE

ADOLF WENDT, OF HOHENSELCHOW, GERMANY

SAFETY PACKING STICK

Application filed February 19, 1930, Serial No. 429,762, and in Germany March 1, 1929.

The simple packing sticks, used for tying cattle in stable, for fastening halter chains on shafts of carts and for other purposes, present the inconvenience that they detach automatically so that the cattle are liberated and can cause trouble, or when the packing stick by means of which a halter-chain is attached to the shaft of a cart detaches accidentally, it may happen that the cart runs in another direction than intended, specially when the road is steep, so that the cart gets out of the driver's control and accidents occur.

This invention relates to a safety packing-stick which can never become accidentally detached. With this object in view two chain links are movably arranged spaced a certain distance apart in the packing stick proper. These two chain links engage with a chain loop having in its upper portion two inwardly directed extensions which leave between their inner edges only so much space that only one chain link but never both chain links simultaneously can pass through this gap.

An embodiment of the invention is illustrated by way of example in the accompanying drawings in which:—

Figure 1:
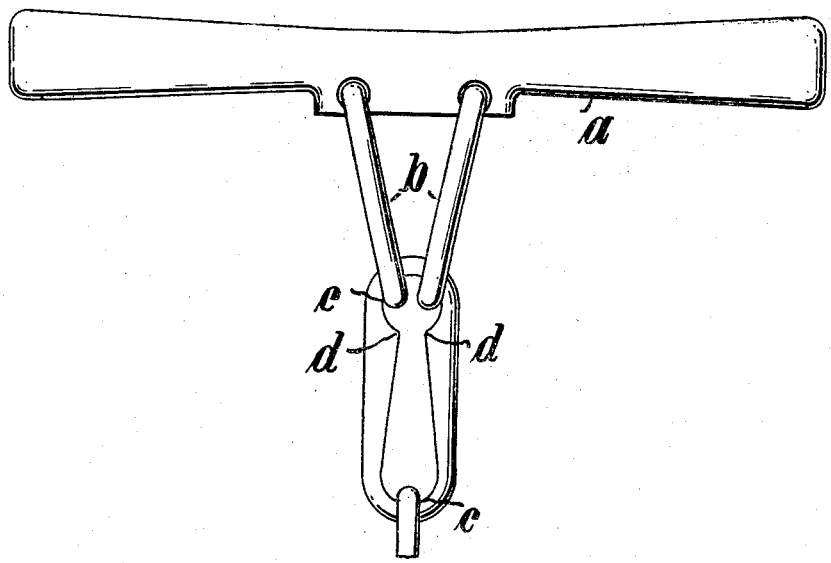
Fig. 1 shows the safety packing stick in front elevation.
Figure 2:
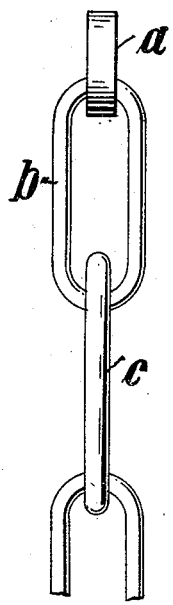
Fig. 2 is a side elevation of the safety packing stick.

The safety packing stick consists of a stick proper $a$ of any suitable form and of two chain links $b$ loosely held in holes arranged in the stick at a suitable distance apart. These chain links $b$ engage with a chain loop $c$ which has on the inner side in its top portion two extensions $d$. The gap between the corners of the extensions $d$ is only wide enough for one chain link $b$ at a time to pass through the same into the lower portion of the chain loop $c$.

I claim:

1. A safety packing stick, comprising in combination with the stick proper having two holes near its lower edge a suitable distance apart, two chain links loosely engaging one with each of said holes, and a chain loop engaging with both chain links.

2. A safety packing stick as specified in claim 1, in which the chain loop has extensions on the inner sides of the parallel arms of said chain loop leaving a gap between them through which only one chain link can pass at a time.

In testimony whereof I affix my signature.

ADOLF WENDT.